A. F. VICTOR.
FRAMING MECHANISM.
APPLICATION FILED MAR. 23, 1916.

1,322,658.

Patented Nov. 25, 1919.
6 SHEETS—SHEET 2.

Witnesses:

Inventor:
Alexander Ferdinand Victor
by Frank D. Thomason
Atty.

A. F. VICTOR.
FRAMING MECHANISM.
APPLICATION FILED MAR. 23, 1916.

1,322,658.

Patented Nov. 25, 1919.
6 SHEETS—SHEET 5.

Witnesses:
W. F. Smith
Florence Mitchell

Inventor:
Alexander Ferdinand Victor,
by Frank D. Thomason
Atty.

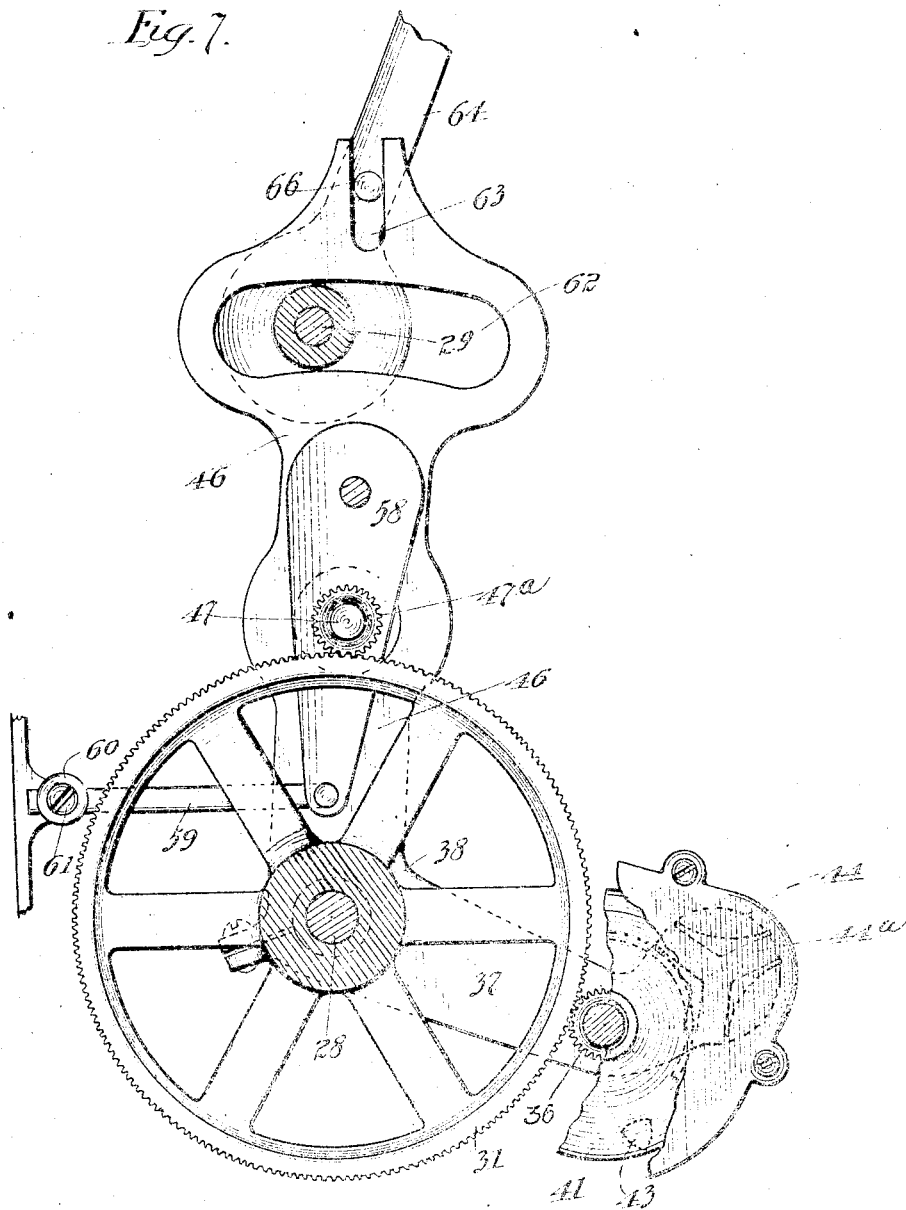

UNITED STATES PATENT OFFICE.

ALEXANDER FERDINAND VICTOR, OF DAVENPORT, IOWA.

FRAMING MECHANISM.

1,322,658. Specification of Letters Patent. Patented Nov. 25, 1919.

Application filed March 23, 1916. Serial No. 86,046.

*To all whom it may concern:*

Be it known that I, ALEXANDER FERDINAND VICTOR, a subject of the King of Sweden, (having declared his intentions of becoming a citizen of the United States,) residing at Davenport, in the county of Scott and State of Iowa, have invented new and useful Improvements in Framing Mechanism, of which the following is a full, clear, and exact description.

My invention relates to improvements in cinematographs, and particularly to the mechanism for imparting an intermittent movement to the film.

The same driving mechanism is employed to impart the intermittent motion to the films of cinematographs that actuates the shutter employed to expose the pictures thereon, and heretofore when a portion of the film is cut out it is necessary to readjust the position of the film longitudinally so as to properly frame the pictures on the screen. This adjustment makes it necessary when the time of operation of the intermittent mechanism is changed to alter the time when the shutter exposes the picture.

The object of my invention is to adjust the film longitudinally in front of the lamp so as to obtain the proper framing thereof on the screen and to simultaneously and automatically adjust the positions of the shutters with relation to the same to time the openings in said shutters and synchronously frame and expose the picture. This and other objects I accomplish by the means hereinafter fully described, and as particularly pointed out in the claims.

In the drawings:

Fig. 7 is an elevation of the synchronizing gearings of my invention and their immediate connections detached from the machine.

Figure 1:
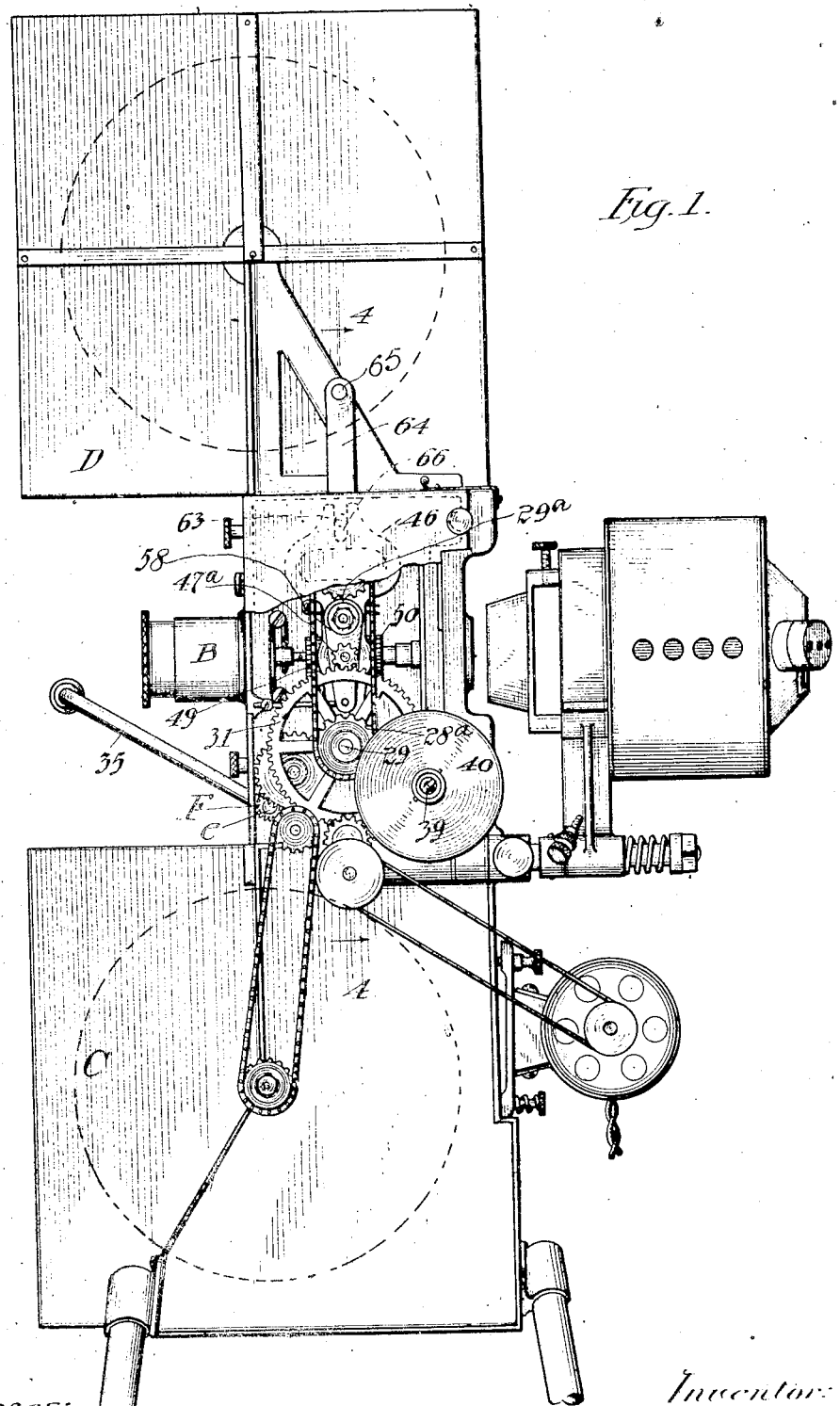
Figure 1 is a side elevation of a cinematograph embodying my improvements, showing a portion of the housing of the same broken away to disclose the mechanism thereof.
Figure 2:
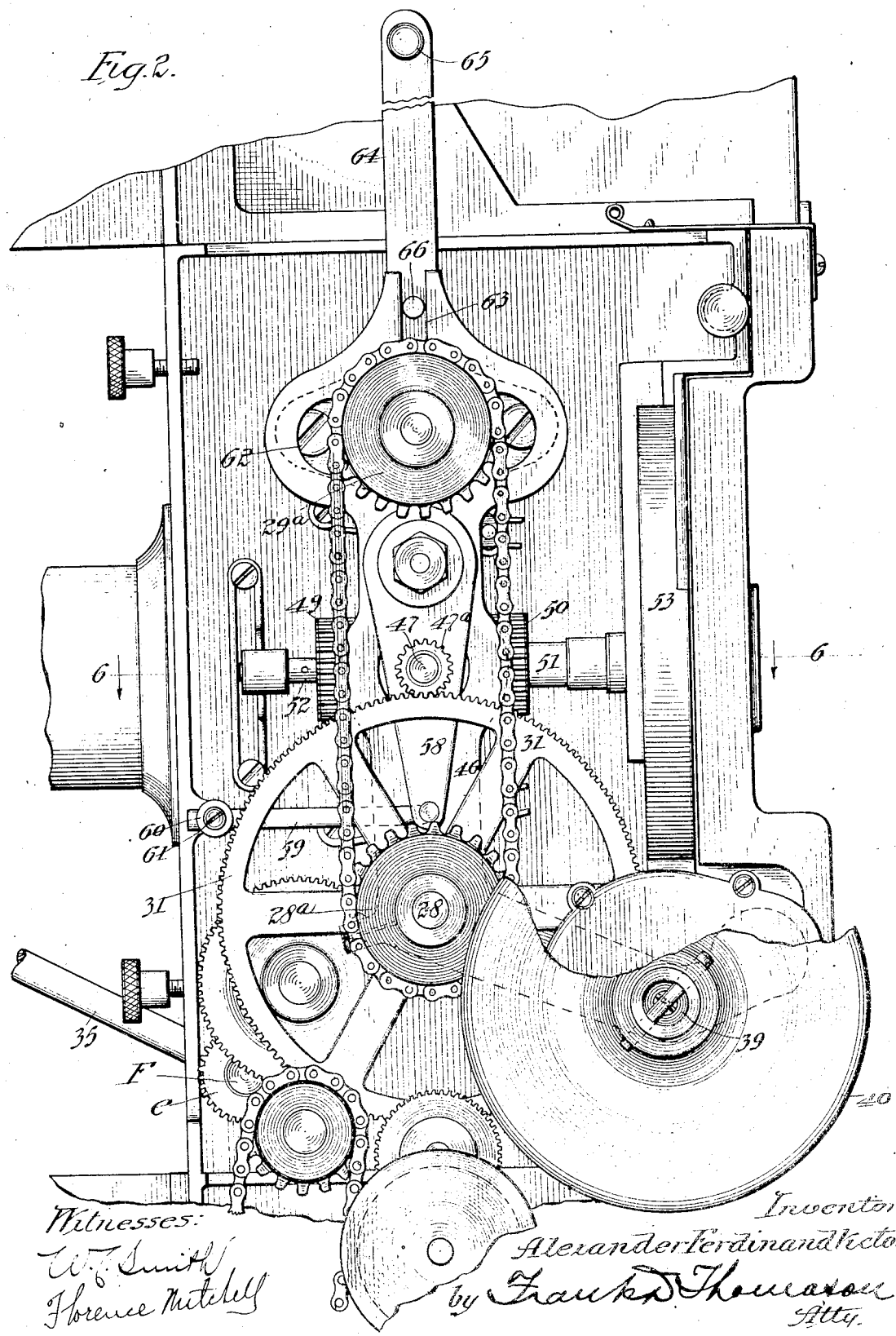
Fig. 2 is an elevation of the central portion with the housing thereof removed and with the portions above and below the same broken away, drawn to a larger scale.
Figure 3:
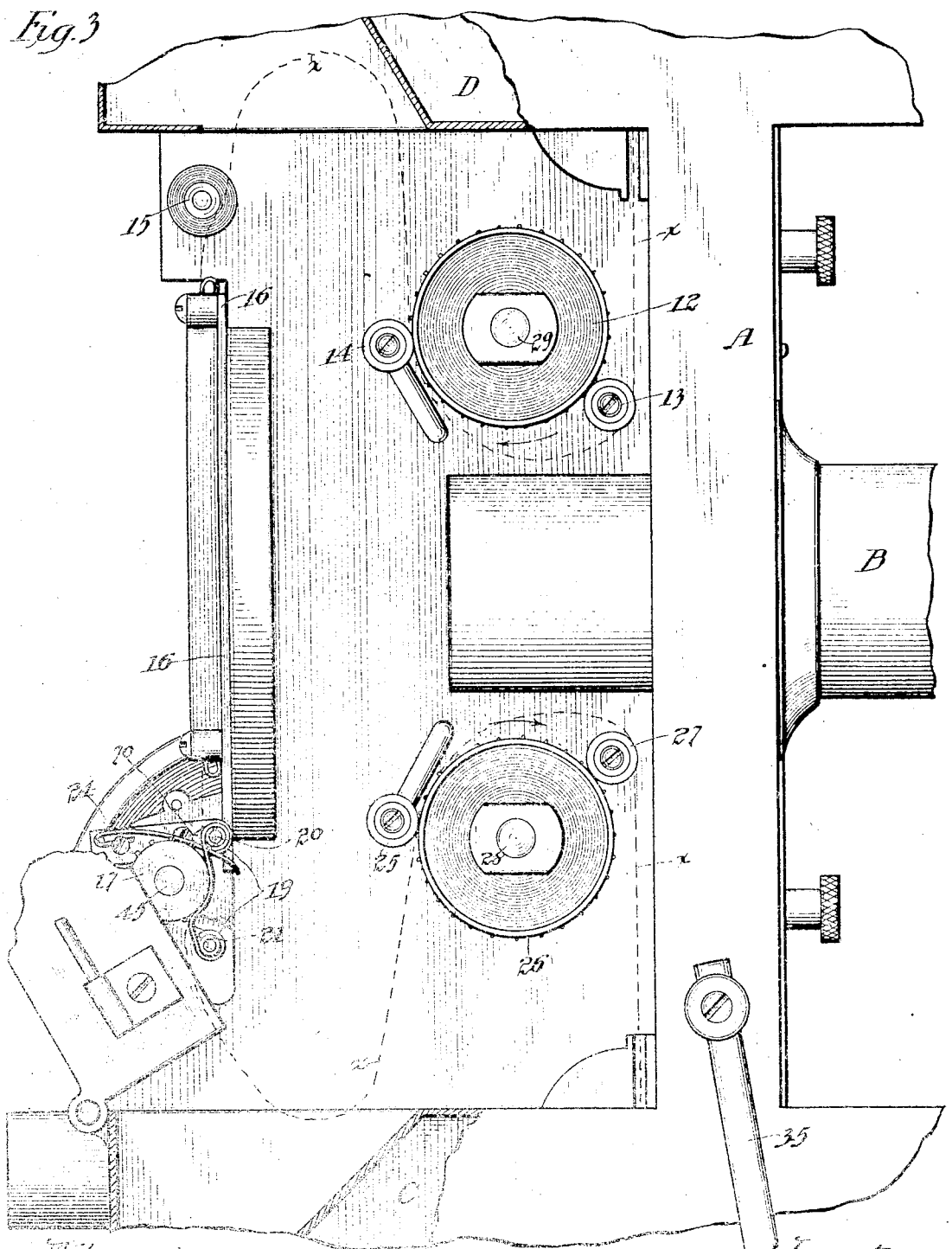
Fig. 3 is an elevation of the opposite side of substantially the same part of the machine shown in Fig. 2 with the covering thereof removed.
Figure 4:
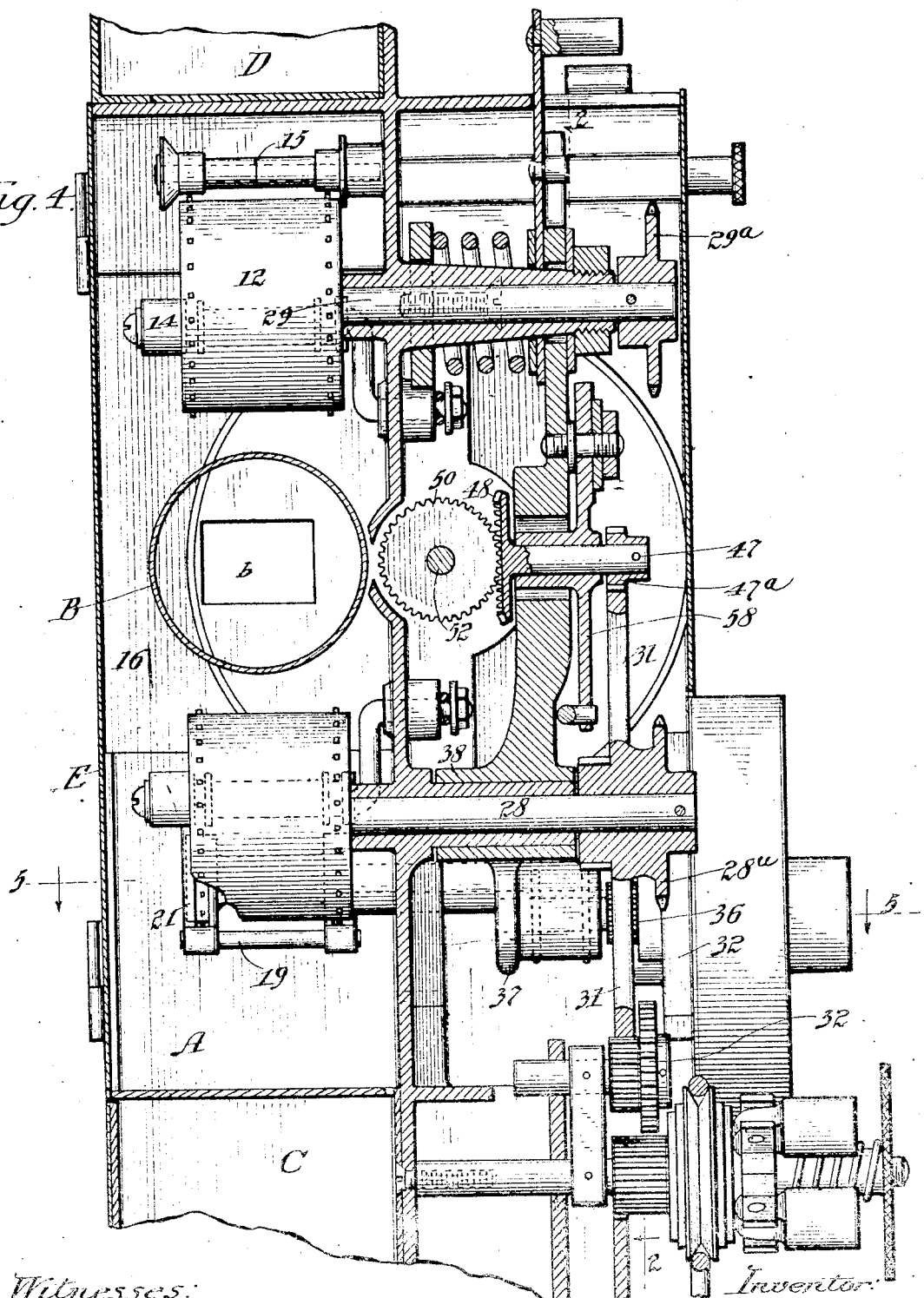
Fig. 4 is a transverse section taken on dotted line 4—4, Fig. 1. drawn to the same scale as Figs. 2 and 3.
Figure 5:
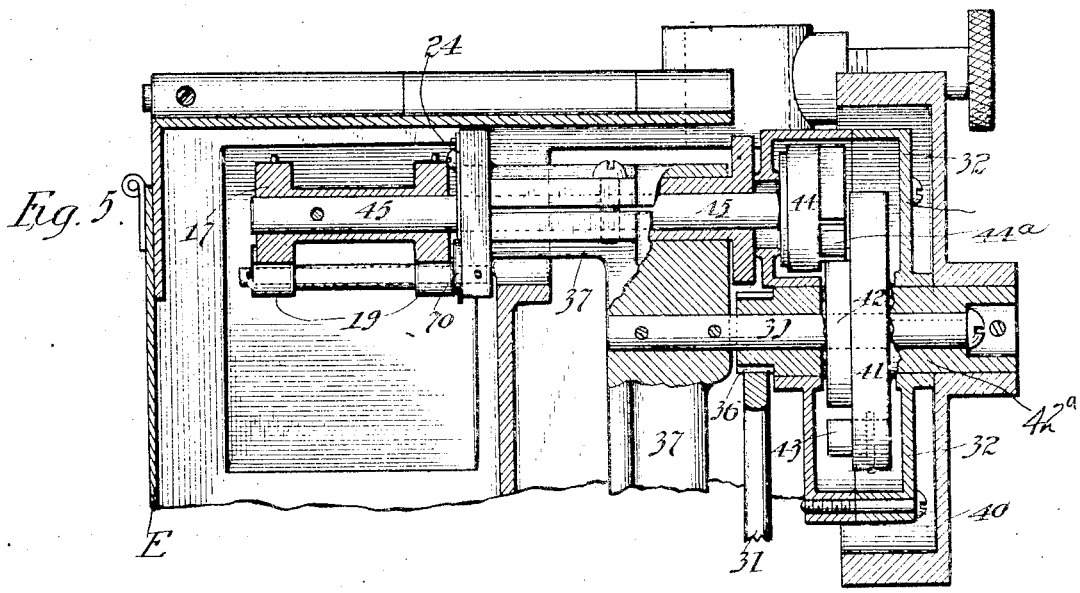
Fig. 5 is a horizontal section taken on dotted line 5—5, Fig. 4.
Figure 6:
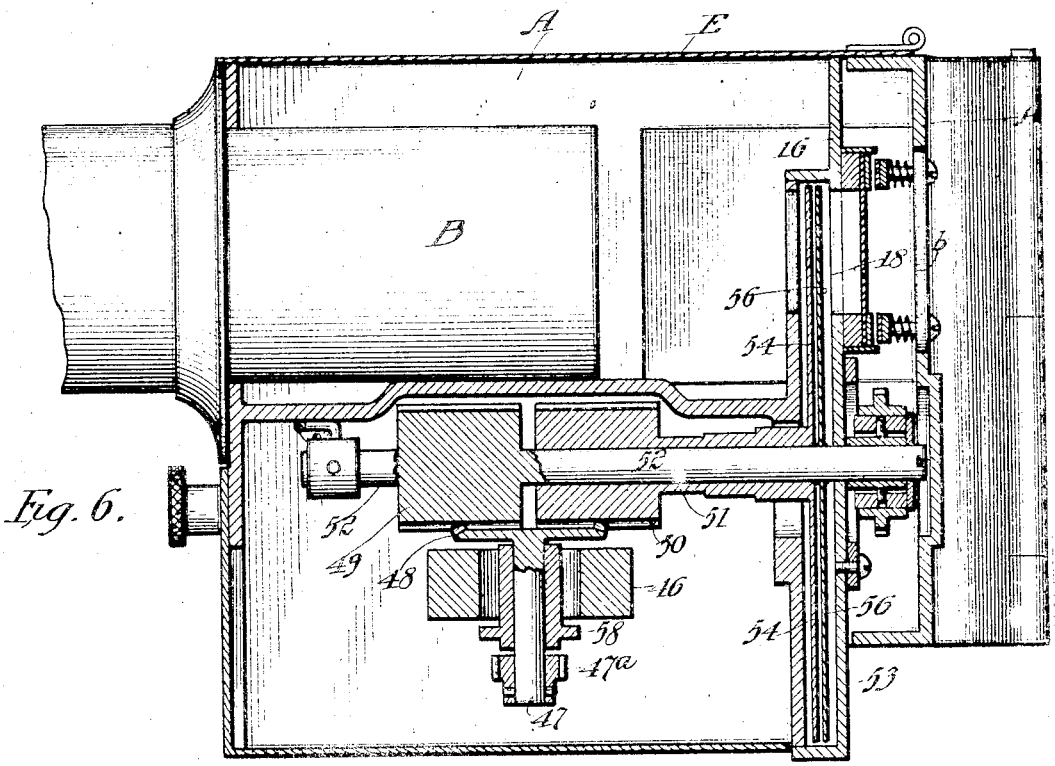
Fig. 6 is a horizontal section taken on dotted line 6—6, Fig. 2.

Referring to the drawings, A represents a rectangular casing in the front vertical wall of which a suitable projecting-lens B is placed, and in the rear of which an opening *b* is made in alinement with the axis of said projecting lens.

This casing A constitutes part of a suitable supporting frame-work for my improved machine that is supported on legs, and this casing is directly mounted upon a substantially square magazine C in which a suitable reel (not shown) for winding the exposed film is journaled, and supports a similar magazine D above it within which a supply-reel (not shown) is journaled.

One longitudinal side of casing A is open and is closed by a suitable door E, which latter is hinged to the rear wall of the casing and has a flat spring that projects laterally and snaps over a pin projecting from the front wall thereof to hold the door closed. The side of this casing opposite said door, preferably, consists of a cast-plate the edges of which are flanged in the opposite direction to form irregular edges or parts of edges of a housing for the mechanism, hereinafter to be described constituting essential parts of my invention. The film *x* passes down from the upper magazine D through a suitable opening in the bottom of the same, into the casing above the cylinder of the projecting-lens, and then passes down to and around an upper feed-drum 12 that is provided with a circumferential series of equi-distant pins or sprockets near each edge thereof. The stretch of film from the upper magazine does not come into direct contact with drum 12, but is initially held out of engagement with the same by an idle-roller 13, and bends upward after it leaves this roller and engages and is held in engagement with said drum by a yielding roller 14. The teeth of the sprockets on the ends of the drum engage the usual perforations in the edges of the film and advance the same in transit to the exposure opening. The film then describes an inverted loop and engages an idle guide roller 15, and then passes vertically downward between a transverse partition 16 and the rear wall of the casing past the exposure opening therein. The lower edge of this partition terminates a suitable distance above the floor of the casing and the film is suitably guided and held taut in transit back of said partition by suitable devices, and below said partition is engaged by the teeth of an intermittently rotating sprocket 17, which imparts the intermittent forward motion to the film past the opening 18 in the partition which alines with the axis of the projecting-lens and opening $b$ in the rear wall of the casing. The film is held in contact with sprocket 17 by a yielding guide 19, which consists of a laterally extending rocking-shaft 20 which has two corresponding curved arms 21, 21 that extend downward therefrom to a suitable point below sprocket 17 and have their lower ends connected by a suitable cross-bar.

After leaving sprocket 17 the film describes a downward loop and then passes up between a yielding idle retaining roller 25 (corresponding to roller 13) and the lower drum 26 (corresponding to drum 12), and then makes a downward bend and is held out of engagement with drum 26 by an idle-roller 27 and passes from thence into the lower take-up magazine.

The shafts 28 and 29 on which drums 12 and 26 are mounted are journaled in suitable bearings cast integral with the side wall of the casing opposite door E, and extend a suitable distance beyond their bearings, and have corresponding sprockets $28^a$ and $29^a$, respectively, secured thereto, that are connected by a chain-belt so as to rotate the drums at the same speed.

The lower shaft 28 has a comparatively large gear 31 made integral with sprocket $28^a$, and this gear is driven through the medium of a train of gears of different diameters by a small gear $e$ on the adjacent end of a drive-shaft F that is journaled in bearings in the lower front portion of the casing. This drive-shaft has its opposite end made tubular and provided with longitudinal slots to receive the spindle on the end of a crank 35 by means of which it is revolved.

Gear 31 engages a pinion 36 secured to a transverse stud 39 that is non-rotatably secured in the adjacent end of the lower horizontally disposed arm 37 of an L-shaped rocking-frame 38, which latter is fulcrumed at its angle on the lower drum-shaft 28. Pinion 36 revolves on this stud 39 next arm 37 and has the boss 42 of a disk 41 made integral with the side thereof opposite said arm 37 and on the side opposite pinion 36 disk 41 has an outwardly extending eccentric boss $42^a$ of less diameter upon whose outer end a balance-wheel 40 is securely mounted. Boss 42 is less in diameter than disk 41, and between the periphery of the disk and the outer circumference of the boss thereof it is provided with a laterally projecting pin 43 which is adapted to engage one end of a series of three equi-distant radial slots $44^a$ once during every revolution of the disk. These slots are made in the periphery of a Geneva wheel 44, and between these slots the outer edge of this wheel is concaved, and these concavities are engaged by the circumference of boss 42 of disk 41 during the interim when pin 43 is out of engagement with the slots of the Geneva wheel. The circumference of boss 42 is recessed so as to permit the passage of the horns of the Geneva wheel while the pin is engaging slots $44^a$.

This Geneva wheel is mounted upon the adjacent end of a shaft 45 that is journaled in the outer end of the horizontal arm of the L-shaped rocking-frame 38, and said wheel and disk are inclosed in a suitable casing 32 that is suitably mounted on shaft 45 and balance-wheel shaft 39.

Shaft 45 extends laterally into the lower rear end of casing 32, and the intermittently rotating sprocket 17, hereinbefore referred to, is mounted thereon. The rocking-shaft forming part of guide 19 has one end journaled in a block secured to the bearings of shaft 45, and has a pear-shaped cam 70 mounted thereon next its bearings, which is engaged by a substantially straight steel wire-spring 24 in such manner as to keep the curved arms of said guide normally pressing toward sprocket 17, and so as to permit said guide to be swung forward away from said sprocket 17 when threading the film through the machine, or otherwise manipulating the same at this point.

The vertically disposed arm 46 of the rocking-frame has a spindle 47 extending through a transversely elongated slot in it, and this spindle 47 has a pinion $47^a$ thereon that is engaged by a large gear 31 causing it to revolve at a greatly increased speed. The opposite end of shaft 47 is provided with a crown-gear 48 and on one side of its center the teeth of this crown-gear engage a barrel-gear 49 securely mounted on a longitudinal shaft 52, and has the diametrical opposite teeth thereof engaging a similar barrel-gear 50 which is securely mounted upon a sleeve 51. The forward end of shaft 52 is journaled in suitable bearings secured to the side of casing A, and the rear end of sleeve 51 is journaled in suitable bearings in a flange of the rear wall 53 of the casing which is in the same transverse vertical plane as partition 16. The rear end of sleeve 51 has a rotary shutter 54 mounted thereon which has a series of two or three equidistant corresponding openings therein the side edges of which are radial, and the rear portion of shaft 52 extending beyond sleeve 51 has a corresponding rotary shutter 56 thereon that has a corresponding series of openings therein.

It will be apparent from the way in which shaft 52 and sleeve 51 are driven that shutters 54 and 56 revolve in opposite directions and that the openings therein, when said shutters are properly assembled to pass each other immediately in front of exposure opening 18 in the partition, will shut off the light projected through said openings both from the top and bottom edges toward the vertical centers of the same, at an equal rate of speed.

In order to frame the pictures of the film properly with reference to exposure-openings B and 18, and particularly when certain portions of the film have been cut out, or when the film is first threaded through the machine, the L-shaped frame is rocked so as to raise or lower the intermittent sprocket which through the medium of gears 31 and 36 will advance or withdraw the film between said openings until the pictures are properly framed. When the L-shaped frame is thus rotatably adjusted the drive-gear 31 remains stationary and pinion 47$^a$ and pinion 36 (which are the same in diameter) revolve, say, approximately seventy degrees, as they travel around gear 31, and through the mechanism, hereinbefore described, rotate the intermittent sprocket 17 and shutters 54 and 56 practically to the same extent and keep them in synchrony. While thus synchronizing the intermittent sprocket and the shutters, the adjustments of the L-shaped frame would, unless some expedient was resorted to, prevent it so doing, cause crown-gear 48 to move the barrel-gears and also shutters 54 and 56 say, five degrees, owing to the fact that the pinion 47$^a$ during the rocking of the frame is caused to travel on the drive-gear 31. I avoid this to such an extent that the movement thus imparted to the barrel-gears is negligible. This I accomplish by journaling spindle 47 in a vertically disposed arm 58, the upper end of which is fulcrumed to the vertical arm of the L-shaped frame at a suitable point above spindle 47. Arm 58 extends below said spindle a suitable distance and has its lower end connected by a stationary rod 59 to a stud 60 projecting laterally from the forward portion of the closed side of the casing through which stud on said rod passes and is secured by a suitable set screw 61.

The vertical arm of the L-shaped frame extends to a point above the upper segment of sprocket 29$^a$ and is provided with a transverse segmental slot 62 through which shaft 29, on which said sprocket is mounted, passes. The upper extremity of said vertical arm of the L-shaped frame is provided with a vertical slot 63, and in order to rock this frame, I have provided a lever 64 one end of which is fulcrumed upon shaft 29 back of said rocking-frame and the upper end of which is provided with a handle 65 at its upper end with which to move it. The lever has a pin 66 projecting out through said slot 63, and when said lever is pushed forward it rocks said L-frame so that its horizontal arm will carry the intermittent sprocket toward the limit of its upward movement, and when said lever is moved toward the rear, the intermittent sprocket will be correspondingly lowered.

In view of the lower end of arm 58 being retained in a stationary position, even though its upper end is moved with the vertical arm of the L-frame, the movement of spindle 47 will be negligible approximately half of the distance traveled by the upper pivotal point of arm 58. The relative positions of said spindle, 47, to gear 31 is thus practically unchanged and the altered positions of the shutters resulting from this movement will not be noticeable.

Having thus described one embodiment of my invention, what I claim as new is:—

1. A cinematograph comprising a projecting lens, a rear transverse wall having an exposure opening therein in alinement with said lens, intermittently revolving means for intermittently moving a moving picture film back of said opening, actuating mechanism for said intermittently revolving means, a rotatable adjustable frame in which said actuating mechanism is suitably mounted and which is adjustable to properly time the framing of the pictures on said film, a rotary shutter journaled independently of said frame, and common drive mechanism for said intermittently revoluble means and said shutter which when said movable frame is adjusted synchronizes the time of exposure of the shutter with the periods of rests of the framed film, the driving means for the shutters and for the intermittently movable means being mounted upon separate elements one of which is moved upon the movement of the other.

2. A cinematograph comprising a projecting lens, a rear transverse wall having an exposure opening therein in alinement with said lens, intermittently revolving means for intermittently moving a moving picture film back of said opening, actuating mechanism for said intermittently revolving means, a rocking-frame in which said actuating mechanism is suitably mounted and which is adjusted to properly time the framing of the pictures back of said exposure opening, a rotary shutter journaled independently of said frame and operable for adjustment upon the movement of said rocking-frame, and mechanism which when said rocking-frame is adjusted synchronizes the time of exposure of the shutter with the periods of rest of the framed film.

3. A cinematograph comprising a projecting lens, a rear transverse wall having an exposure opening therein in alinement with said lens, intermittently movable means including a sprocket and Geneva movement on the shaft thereof for intermittently moving a moving picture film back of said opening, actuating mechanism for said intermittently revolving means, a rocking-frame in which said actuating mechanism is suitably mounted, actuating gear for said means journaled in said frame, a rotary shutter journaled independently of said rocking-frame and for adjustment by the movement of the frame and mechanism which when said rocking-frame is adjusted synchronizes the time of exposure of the shutter with the periods of rest of the framed film.

4. A cinematograph comprising a projecting lens, a rear transverse wall having an exposure opening therein in alinement with said lens, intermittently movable means including a sprocket, a Geneva-movement-gear for actuating the same, and a balance wheel, a rocking-frame in which said intermittent means are rotatably mounted, a drive-shaft on which said rocking-frame is loosely mounted, and gear secured to said drive-shaft through the medium of which said Geneva-movement gear is driven, a rotatable shutter, a longitudinally disposed shaft mounted upon a stationary portion of the machine on which said shutter is mounted, a barrel-gear thereon, a crown-gear engaging the same, and a common drive gear for imparting motion to said intermittently movable means and crown-gears, said crown-gear being mounted for adjustment upon the movement of said rocking-frame.

5. A cinematograph comprising a projecting lens, a rear transverse wall having an exposure opening therein in alinement with said lens, intermittently movable means, a rocking-frame in which said intermittent means are rotatably mounted, a drive-shaft on which said rocking-frame is loosely mounted, and gear secured to said drive-shaft through the medium of which said Geneva-movement gear is driven, a rotatable shutter, a longitudinally disposed shaft mounted upon a stationary portion of the machine, on which the shutter is mounted, a barrel-gear thereon, a crown-gear engaging the same, and a common drive-gear for imparting motion to said intermittently movable means and crown-gear, said crown-gear being mounted for adjustment upon the movement of the rocking-frame.

6. A cinematograph comprising a projecting lens, a rear transverse wall having an exposure opening therein in alinement with said lens, intermittently movable means, a rocking-frame in which said intermittent means are rotatably mounted, a drive-shaft on which said rocking-frame is loosely mounted, and gear secured to said drive-shaft through the medium of which a Geneva-movement gear is driven, said Geneva-movement gear, a rotatable shutter, a longitudinally disposed shaft mounted upon a stationary portion of the machine, on which the shutter is mounted, a barrel-gear thereon, a crown-gear engaging the same movable to a limited extent in the same direction as and simultaneously with and relatively to said rocking-frame, and a common drive-gear for imparting motion to said intermittently movable means and crown-gear.

7. A cinematograph comprising a projecting lens, a rear transverse wall having an exposure opening therein in alinement with said lens, intermittently movable means, a rocking-frame in which said intermittent means are rotatably mounted, a drive-shaft on which said rocking-frame is loosely mounted, and gear secured to said drive-shaft through the medium of which a Geneva-movement gear is driven, said Geneva-movement gear, a rotatable shutter, a longitudinally disposed shaft mounted upon a stationary portion of the machine, on which the shutter is mounted, a barrel-gear thereon, a crown-gear engaging the same, an arm in which said crown-gear is journaled one end of which is pivoted to said rocking-frame and the other end held stationary, and a common drive gear for imparting motion to said intermittently movable means and crown-gear.

8. A cinematograph comprising a projecting-lens, a rear transverse wall having an exposure opening therein in alinement with said lens, intermittently movable means for moving a cinematographic film, an L-shaped frame in the horizontally disposed arm of which said means are journaled, two rotatable shutters, a longitudinally disposed shaft to which one of said shutters is secured, a sleeve loosely mounted on said shaft and to the end of which adjacent said first mentioned shutter the other shutter is secured, barrel-gears secured respectively to the opposite ends of said shaft and sleeve, a crown-gear journaled in an arm which is secured to the upright portion of the L-shaped frame and which on one side engages one of said barrel-gears and on the opposite side engages the other barrel-gear, and a common drive-gear for actuating both said intermittently movable means and said crown-gear.

9. A cinematograph comprising a projecting-lens, a rear transverse wall having an exposure opening therein in alinement with said lens, intermittently movable means for moving a cinematographic film, an L-shaped rocking-frame in the horizontally disposed arm of which said means are journaled, two rotatable shutters, a longitudinally disposed shaft to which one of said shutters is secured, a sleeve loosely mounted on said shaft and to the end of which adjacent said first mentioned shutter the other shutter is secured, barrel-gears secured respectively to the opposite ends of said shaft and sleeve, a crown-gear engaging both of said barrel-gears and movable to a limited extent along said gears in the same direction as and simultaneously with said rocking-frame, and a common drive-gear for actuating both said intermittently movable means and said crown-gear.

10. A cinematograph comprising a projecting-lens, a rear transverse wall having an exposure opening therein in alinement with said lens, intermittently movable means for moving a cinematographic film, an L-shaped frame in the horizontally disposed arm of which said means are journaled, two rotatable shutters, a longitudinally disposed shaft to which one of said shutters is secured, a sleeve loosely mounted on said shaft and to the end of which adjacent said first mentioned shutter the other shutter is secured, barrel-gears secured respectively to the opposite ends of said shaft and sleeve, a crown-gear engaging both of said barrel-gears, an arm in which said crown-gear is journaled one end of which is pivoted to the vertical arm of said L-shaped frame and the other end of which is held stationary, and a common drive-gear for actuating both said intermittently movable means and said crown-gear.

11. A cinematograph comprising a projecting-lens, a rear transverse wall having an exposure opening therein in alinement therewith, intermittently movable means for moving a cinematograph film, an L-shaped rocking-frame journaled at its angle to a suitable shaft in the horizontally disposed arm of which said means have bearings, a large gear mounted on said shaft that actuates said intermittent means, a pendent arm pivoted at its upper end to the vertical arm of said rocking-frame, a rod for holding the lower end of said arm stationary, a transverse spindle journaled in said arm that extends through said rocking-frame, a pinion on one end of said spindle engaged by said large gear, and a crown-gear on the opposite end thereof, in combination with a longitudinally disposed shaft, a sleeve loosely mounted thereon, a barrel-gear secured to said longitudinal shaft, a barrel-gear secured on the adjacent end of said sleeve, which barrel-gears are driven in opposite directions by said crown-gear, and two corresponding circular shutters having suitable exposure-openings therein one of which is secured to said sleeve and the other to said shaft.

12. A cinematograph comprising a projecting lens, a rear transverse wall having an exposure opening therein in alinement with said lens, intermittent gearing for moving the picture film through the cinematograph, rotary shutters co-acting therewith, a rotatably adjustable frame, a drive gear the axis of which is parallel to the intermittent gearing and at right angles to the axis of said shutters, and two gears adapted, respectively, to transmit motion to said intermittent gearing and said shutters that are engaged by said drive-gear and said adjustable frame and said gears coöperating to simultaneously synchronize the action of the shutters and intermittent gearing when said frame is rotated.

In witness whereof I have hereunto set my hand this 13th day of March, 1916.

ALEXANDER FERDINAND VICTOR.

Witnesses:
FRANK D. THOMASON,
UDO CLAUSSEN.